V. Chase,
Tenoning Machine.

N°36,138.    Patented Aug. 12, 1862.

2 Sheets–Sheet 1.

Witnesses:
J. H. Phillips
A. C. Klink

Inventor:
Valentine Chase

V. Chase,
Tenoning Machine.

N°36,138.   Patented Aug. 12, 1862.

Witnesses:
J. H. Phillips
A. C. Klink

Inventor:
Valentine Chase

UNITED STATES PATENT OFFICE.

VALENTINE CHASE, OF ST. MARY'S PARISH, LOUISIANA.

IMPROVEMENT IN TENONING-MACHINES.

Specification forming part of Letters Patent No. 36,138, dated August 12, 1862.

*To all whom it may concern:*

Be it known that I, VALENTINE CHASE, of the parish of St. Mary, in the State of Louisiana, have invented a new and useful Machine for Cutting Tenons on Timbers, designed for the use of framers and builders; and I do hereby declare the following to be a full, clear, and exact description of the construction and operation of the same, the several material parts thereof being described by numbers, reference being had to the accompanying drawings.

Figure 1:
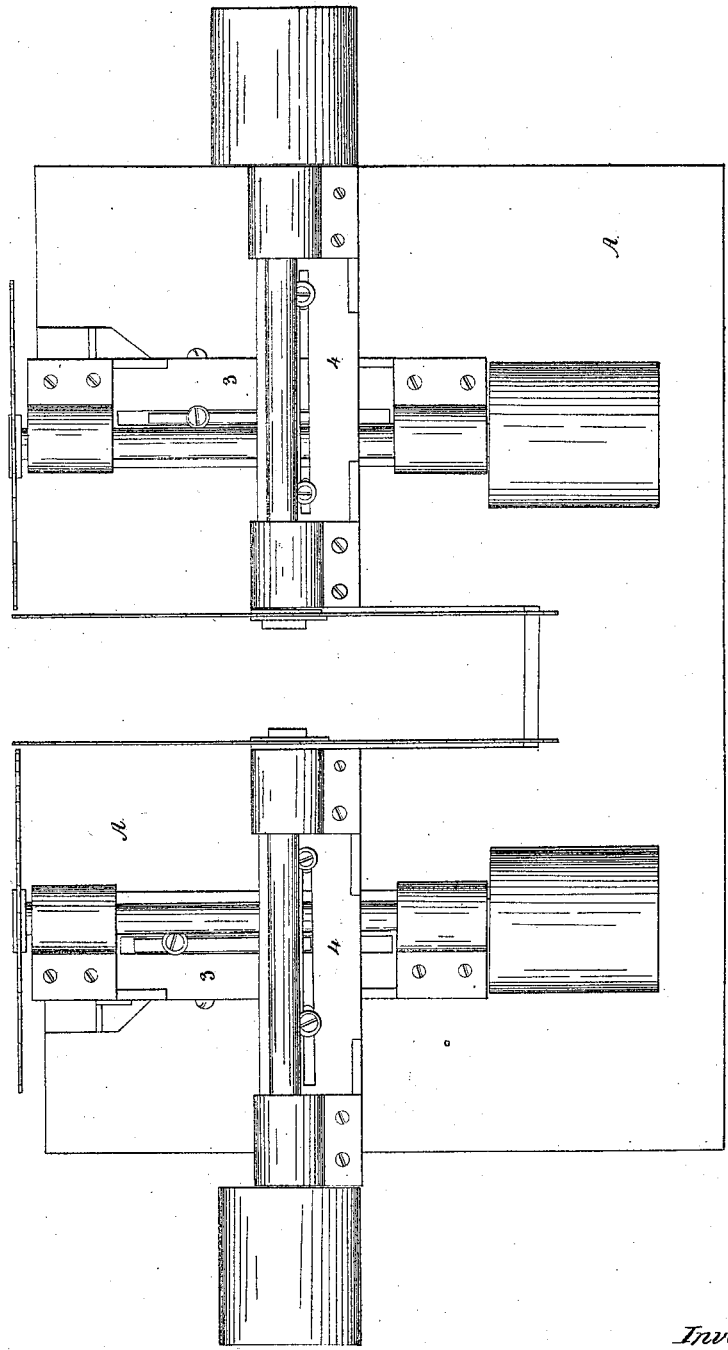
Figure 2:
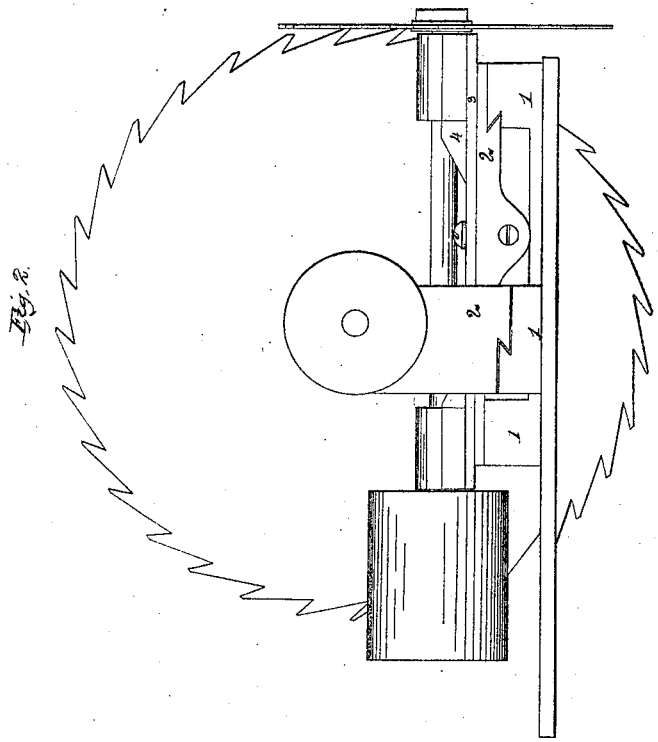

Figure 1 is a top view or plan of my machine; and Fig. 2 is an end view of the dovetailed adjusting-plates, together with the operating mechanism by which two of the saws are driven. The other two saws are arranged in the same way and operated through precisely the same means.

For the sake of accuracy and to facilitate description, I will suppose my machine placed on the side of a table or stand, A, to which it is firmly attached by bolts at equal distances from the ends of the table, the table being cut or notched to suit the shape of the machine and allow a timber to pass down through it. The machine is driven by a drum situated immediately below the table. The casting consists, mainly, of iron plates three-eighths of an inch thick and three inches wide, with the modifications of shape and extension hereinafter indicated. It is proper here to remark that it may be found expedient in manufacturing this machine to cast an iron stand in connection with bottom plate of the machine, thus dispensing with the wooden table.

Plates numbered 1 and 2 are in the form of a cross, being eleven inches between the extreme ends of the opposite arms, and are so constructed that one of the arms is four inches longer than its opposite arm, the other two arms being equal the one to the other. Two inches of the end of the long arm of the bottom plate is widened out on one side, so as to make the plate four inches in width at this end, which I will call the "front," for this arm is to have a direction across the table and be so placed that the extended or produced side shall not be next to the middle point of the side of the table. On the several ends of the arms of this plate No. 1 are elevations an inch high and an inch and a half in width, which I will call "blocks." The plate is strengthened by cross-ribs between these blocks. These blocks support plate No. 2, and the front one and the next two in the rear of it are halved and dovetailed lengthwise of the table in a manner to receive a corresponding dovetail on the under side of plate No. 2, so that plate No. 2 may move back and forth lengthwise of the table in this dovetail as a guide without being allowed to raise or move in any other direction. On the under side of the long arm of No. 2, attached to that edge of it which corresponds with the extended side of No. 1, is an ear, through which a thumb-screw passes (having a fixed collar on each side of the ear) to a corresponding hole in a raised part of the rib on plate No. 1, which is prepared with a thread to receive the screw. By means of this screw plate No. 2 is moved back and forth at pleasure in the groove or dovetail before described.

Plate No. 3 is straight, is thirteen inches long, and is strengthened by a rib on one edge. It is furnished with a slot extending lengthwise within two and a quarter inches of each end. This plate lies flat on plate No. 2, crosswise of the table, its slot fitted to a guide on the upper side of plate No. 2, which guide is two inches shorter than the slot in plate 3, allowing to plate No. 3 a longitudinal play of two inches. This plate No. 3 is made fast in any desired position by means of set-screws passing through its slot into the plate below and driven till their heads press hard on plate No. 3. Upon the ends of this plate No. 3 are boxes, which receive a shaft or saw-mandrel lying lengthwise of the plate, and consequently crosswise of the table. On the rear end of this shaft is a pulley, and on the front end a saw.

On the ends of the arms of plate No. 2, which extend longitudinally with the table, are blocks two inches high, extending inward three inches from the end of the arm, the inner ends being tapered and rounded at the point to receive a set-screw through a slot in the plate above. This plate above is plate No. 4, and is in all respects like plate No. 3, except that it is an inch shorter. It lies on the blocks of plate No. 2 lengthwise of the table. It has a slot through which set-screws pass into the blocks to make it fast. It receives a mandrel with saw and pulley in the same manner as plate No. 3, except that its saw is eighteen inches in diameter, while that of plate No. 3 is only twelve inches, and its saw is adapted to cutting lengthwise of the timber, while that of plate No. 3 is adapted to cutting crosswise. It is apparent from this description that these two mandrels cross each other at right angles, and consequently their saws are at right angles to each other. It is further apparent that by the movable plates 3 and 4 the extreme cutting-edges of these saws may be brought to the same vertical line by means of the adjusting screws and slots in plates 3 and 4, the one being two inches higher than the other, and if these saws be put in motion and the end of a timber pass down through them a square block will be sawed out of one corner.

This is just one half of the machine. The other half is the exact counterpart of this, and, being placed on the other side of the timber, saws a similar block from the other corner, leaving only the tenon between. The thickness of this tenon is regulated by the thumb-screws, already described, which move plate No. 2 with everything attached to it.

The two halves of the machine are placed upon the table so as to allow the nearest approach of the two large saws to each other to be one inch and their greatest distance from each other three inches; consequently they cut any tenon between these sizes.

The timber, when applied to the machine, will rest on a vertical frame, which is moved up and down by a pinion turned by a crank and working into a straight section of cogs attached to the frame.

What I claim, and desire to secure by Letters Patent, is—

1. The combination of saws upon the adjustable plates or equivalents, by which the sides and shoulders of tenons may be cut at one operation, and whereby tenons of different sizes are made, the tenon being cut and completed by one movement of the timber, all substantially as described.

2. In combination with the saws and adjusting-plates by which the size of the tenon may be varied, the adjusting slots and screws in and shifting position of plates 3 and 4, by means of which the edges or peripheries of the saws which form either side and shoulder of the tenon may be adjusted to the same vertical line, and thus compensate for the wear of the saws, substantially as described.

3. The construction and arrangement of the plates 1, 2, 3, and 4, operated in the manner and for the purposes specified.

VALENTINE CHASE.

Witnesses:
  F. O. CALLAGHAN,
  JNO. H. JOHNSON.